United States Patent [19]

O'Brien et al.

[11] Patent Number: 5,576,367
[45] Date of Patent: Nov. 19, 1996

[54] POLYESTER GASKET PLASTICIZERS SUITABLE FOR USE WITH INTERNALLY PLASTICIZED APPLIANCE COATINGS

[75] Inventors: William L. O'Brien; William J. Mertz, both of Cincinnati, Ohio

[73] Assignee: Henkel Corporation, Ambler, Pa.

[21] Appl. No.: 460,422

[22] Filed: Jan. 3, 1990

[51] Int. Cl.⁶ .................................................. C08K 5/09
[52] U.S. Cl. ........................... 524/291; 524/311; 524/314
[58] Field of Search ................................ 524/291, 311, 524/314

[56] References Cited

U.S. PATENT DOCUMENTS

| | | | |
|---|---|---|---|
| 4,133,794 | 1/1979 | Lamb | 524/314 |
| 4,379,190 | 4/1983 | Schenck | 524/306 |
| 4,824,990 | 4/1989 | Mertz | 524/310 |

FOREIGN PATENT DOCUMENTS

| | | | |
|---|---|---|---|
| 560036 | 7/1958 | Canada | 524/311 |
| 495333 | 12/1975 | U.S.S.R. | 524/311 |

*Primary Examiner*—Peter D. Mulcahy
*Attorney, Agent, or Firm*—Wayne C. Jaeschke; John E. Drach; Henry E. Millson, Jr.

[57] ABSTRACT

Liquid polyester plasticizers, having a hydroxyl value of at least 25, are incorporated into vinyl resins, such as PVC, which are formed into gaskets for use on appliances made from textured coil stock, especially refrigerators or freezers. These plasticizers have no detrimental effect on the relatively soft surface coatings on such appliances.

11 Claims, 1 Drawing Sheet

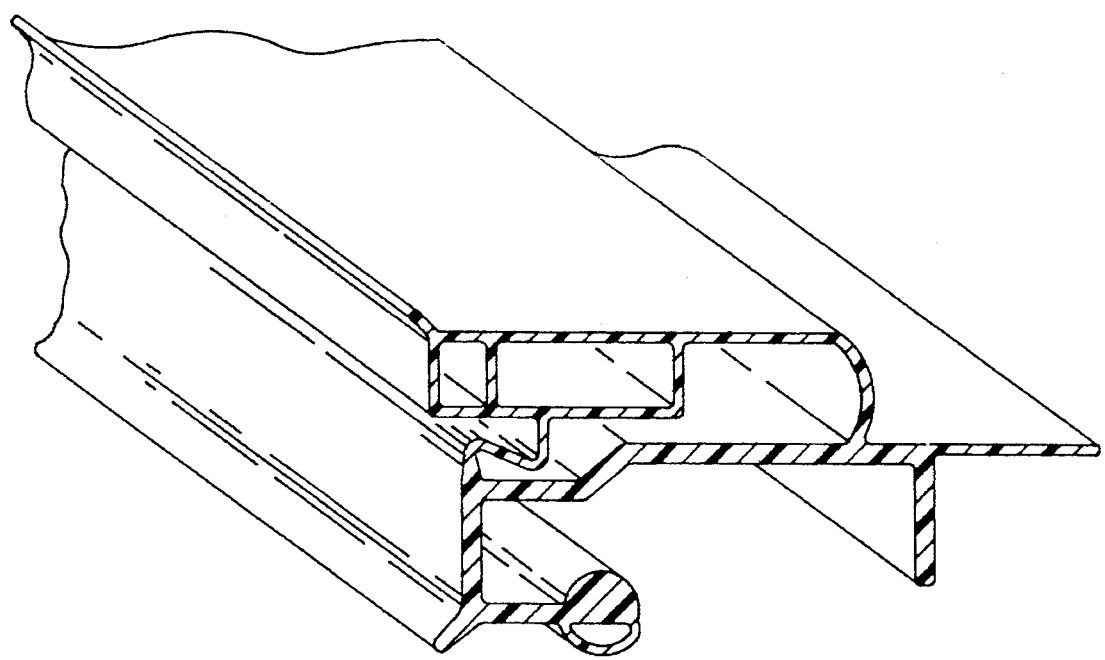

POLYESTER GASKET PLASTICIZERS SUITABLE FOR USE WITH INTERNALLY PLASTICIZED APPLIANCE COATINGS

FIELD OF THE INVENTION

The invention relates to liquid polyesters having a relatively high hydroxyl value and to the use of such polyesters, and certain derivatives thereof, as plasticizers for vinyl resins, especially PVC. Resins plasticized with the liquid polyester of the invention are compatible with textured coil stock currently used by home appliance manufacturers, producing no appreciable detrimental effects on the surface coating with which they come in contact.

BACKGROUND OF THE INVENTION

Recent developments in the manufacture of major home appliances, such as refrigerators and freezers, involve the use of textured metal to reduce the amount of rejected units due to cosmetic flaws, and to increase rigidity, allowing "down-gauging" of sheet metal (coil) stock. Metal "texturing" is a term of art used to describe a metal stamping operation which, in the current manufacture of home appliances, is performed on painted coil stock. Texturing of metal after painting dictates the use of a soft, internally plasticized coating which can undergo the stamping process without damage. Typically, alkyd coatings are used, which have a glass transition temperature (Tg) in the range of 95°–100° C. Such coatings have been shown to be readily attacked under normal conditions by the polymeric plasticizers in gaskets currently provided on refrigerator and freezer doors.

The prior art plasticizers destroy the mar resistance of the coil stock coating, that is, the ability of the coating to withstand scratching and scuffing actions, which tend to disfigure or otherwise adversely affect the surface appearance of the coating.

SUMMARY OF THE INVENTION

The detrimental effects produced by prior art plasticizers on prepainted textured metal are avoided by substituting the liquid polyesters of the invention for the prior art plasticizers in gaskets provided on appliances made from textured metal.

In accordance with the present invention, it has surprisingly been found that liquid polyesters having relatively high hydroxyl values, on the order of 25 or greater, are useful as plasticizers for vinyl resins, particularly PVC. Vinyl resins containing the plasticizers of the invention are conveniently formed into gaskets for appliances, including particularly, refrigerators and freezers. The resulting gaskets are compatible with the types of soft coatings provided on the textured coil stock used to manufacture such appliances.

The liquid polyesters of the invention have the general formula

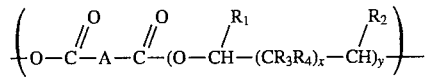

wherein, in each subunit (n) of the polyester, A is independently selected from the group consisting of straight or branched, saturated hydrocarbon chains, containing from 1 to 10 carbon atoms, or substituted or unsubstituted arylene moieties, and $R_1$, $R_2$, $R_3$ and $R_4$ are each independently selected from the group consisting of hydrogen or alkyl containing from 1 to 4 carbon atoms; n=4–20, x=0–4 and y=1–3. The polyesters of the invention preferably have a hydroxyl value of at least 25.

According to a preferred embodiment, the liquid polyesters of the invention comprise the following subunits:

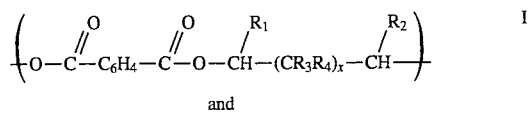

and

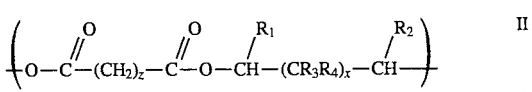

wherein $R_1$, $R_2$, $R_{R3}$ and $R_4$ are each independently selected from the group consisting of hydrogen or alkyl containing from 1 to 4 carbon atoms, x=0–4 and z=2–4, with subunit I comprising from about 5 to about 40 percent of the total subunits of the polyester, and subunit II comprising from about 60 to about 95 percent of the total subunits of the polyester.

In a particularly preferred embodiment of the invention, the reactive components constituting the polyester are (i) a mixture of aromatic and straight chain dicarboxylic acids, specifically, terephthalic acid, succinic acid, glutaric acid and adipic acid, and (ii) a mixture of diols, namely, propylene glycol and neopentyl glycol.

BRIEF DESCRIPTION OF THE DRAWING

The sole FIGURE of the drawing is a perspective view of a cross-section of a gasket of the type which is beneficially plasticized using the polyesters of the invention showing the structured detail of the gasket.

DETAILED DESCRIPTION OF THE INVENTION

The liquid polyester plasticizers of the invention may be appropriately described by reference to the reactive components used in the preparation thereof, which include an alcohol component comprising at least one aliphatic diol and an acid component comprising at least one dicarboxylic acid.

The polyesters of the invention may be made from various straight or branched chain aliphatic diols including neopentyl glycol, propylene glycol, 1,3-butanediol, ethylene glycol, diethylene glycol and triethylene glycol, to name a few.

Dicarboxylic acids useful in making the polyesters of the invention include both aliphatic acids, such as succinic, glutaric, adipic, azelaic and sebacic acid, and aromatic acids, such as terephthalic, isophthalic acid, and phthalic anhydride. While the polyesters of the invention may contain exclusively aliphatic dicarboxylic acid(s), they may not contain exclusively aromatic dicarboxylic acid(s), as the resultant product would not be liquid.

It will be apparent to those skilled in the art that the various art-recognized equivalents of the aforementioned dicarboxylic acids, i.e., anhydrides and lower alkyl esters thereof, may be employed for the preparation of the polyester products of the invention. Therefore, as used herein the term "acid" is intended to encompass such acid derivatives. Methyl esters are particularly advantageous for the preparation of the polyesters described herein. Mixtures of acids, anhydrides, and esters may also be reacted to obtain useful plasticizer products.

A particularly useful product is obtained by reacting substantially stoichiometric amounts of an alcohol component comprising propylene glycol and neopentyl glycol, in an equivalent ratio from about 1.0:1.0 to about 0.4:0.6 based on the total alcohol component equivalents, with an acid component comprising dimethyl terephthalate and a mixture of the dimethyl esters of succinic acid, glutaric acid and adipic acid in an equivalent ratio of about 0.9:0.1, based on the total acid component equivalents. In this particular embodiment, the mixture of aliphatic dicarboxylic acid esters comprises 1% dimethyl succinate, 75% dimethyl glutarate and 24% dimethyl adipate, based on the total weight of the mixture.

This reaction yields a polyester comprising subunits

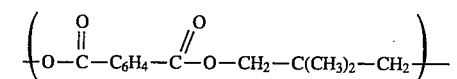  (III)

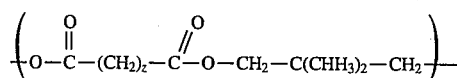  (IV)

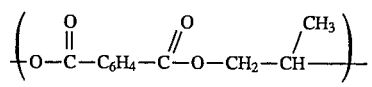  (V)

and

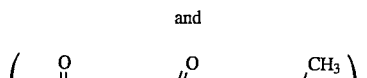  (VI)

wherein z=2–4, subunit III comprising from about 2.5 to about 15 percent of the total subunits of the polyester, subunit IV comprising from about 15 to about 50 percent of the total subunits of the polyester, subunit V comprising from about 2.5 to about 24 percent of the total subunits of the polyester, and subunit VI comprising from about 35 to about 80 percent of the total units of the polyester.

Preferably, the polyester comprises the above-identified subunits wherein z=2 in about 0.2 to about 2.0 percent of subunits IV and VI; z=3 in about 60 to about 85 percent of subunits IV and VI; and z=4 in about 15 to about 40 percent of subunit IV and VI.

The source of the acids or acid derivatives and the manner by which the dicarboxylic acid mixture is produced is of no consequence so long as the resulting mixture contains the specified acids or acid derivatives in the required ratios. Thus, dicarboxylic acid or acid derivative mixtures can be obtained by blending the individual acid components. On the other hand, mixtures of acids obtained as by-products from various manufacturing operations and which contain one or more of the necessary acid components may be advantageously utilized. For example, mixed dimethyl esters of adipic, glutaric and succinic acids may be obtained as a co-product from the manufacture of adipic acid and may be conveniently blended with any other acid or ester, e.g., an aromatic dicarboxylic acid, selected for inclusion in the polyester of the invention.

The liquid polyesters of the invention are prepared by reacting substantially stoichiometric amounts of the alcohol component and acid component, using conventional reaction techniques. Reaction of the acid and alcohol components to obtain the desired polyesters is carried out in standard esterification equipment following established esterification procedures. Typically, all of the reactants are charged to a suitable esterification vessel and heated under atmospheric pressure at temperatures on the order of about 150°–250° C. for a period of time sufficient to substantially complete the esterification reaction. The reaction may be driven to completion by vacuum distillation (typically 2–50 mm Hg absolute at 200°–250° C.) until the desired hydroxyl value is obtained. Vacuum distillation removes the final traces of water, any excess reactants and small amounts of other volatile materials and assists in driving the reaction to completion. The polyester product is then cooled and is normally ready for use.

The reaction mixture does not include a polymerization terminator. Thus, the final polyester product obtained from the reaction is unterminated which accounts of its relatively high hydroxyl value. The available hydroxyl functionalities may be post-acylated, if desired, in order to lower the viscosity of the resultant polyester, or its extractability from the plasticized vinyl resin. Acylated derivatives of the above-described polyesters, e.g., acetyl derivatives thereof, are also within the scope of the present invention. The hydroxyl values of the acylated derivatives of the polyester generally fall between about 5 and about 15, and preferably range from about 8 to about 12.

If an improvement in color is desired, the polyester may be bleached by any of the well known and accepted bleaching methods, e.g., using hydrogen peroxide or hypochlorite. Alternatively, the polyester may be decolorized by filtering through a filter aid, charcoal or bleaching clay.

The esterification reaction is generally carried out without use of a catalyst. Where shorter processing times are desired, however, a reaction catalyst may be advantageous. Known esterification catalysts, such as phosphoric acid, p-toluenesulfonic acid, stannous oxalate, alkyltin oxides, or the like may be utilized in small amounts to facilitate the reaction. When esterification is complete, the catalyst may be deactivated or removed by filtering or other conventional means. Catalysts useful for effecting ester interchange include dibutyltindiacetate, stannous oxalate, dibutyltin oxide, tetrabutyl titanate, zinc acetate and the like. When such catalysts are used it is not necessary that the catalyst be present throughout the entire reaction. It is sometimes advantageous in order to obtain products having good color and relatively low acid value, on the order of 2 mg. KOH/gm, or less, to add the catalyst during-the final stages of the reaction. Upon completion of the reaction the catalyst may be deactivated and removed by filtering or other conventional means.

Inert diluents such as benzene, toluene, xylene and the like may be employed for the reaction; however, the use of diluents is not necessary. In fact, it is generally considered to be desirable to conduct the reaction without diluents since the resultant polyester can be directly used as obtained from the reactor.

In the above-mentioned preferred embodiment, the amount of propylene glycol employed in making the polyesters of the invention comprises about 50 to about 60 equivalent percent, and the amount of neopentyl glycol comprises about 40 to about 50 equivalent percent of the total alcohol component equivalents. In performing the esterification reaction, a slight excess of propylene glycol is generally used to assist in driving the reaction to completion. Any excess diol is readily removed from the reaction product via vacuum distillation.

The hydroxyl values of the unterminated liquid polyesters produced in accordance with the foregoing procedure are generally at least 25, most often falling between 25 and about 45. The acid value is generally less than 3 and most preferably between about 0.1 and about 2.0. The average molecular weight of the resultant polyester is in the range of 3,000 to 10,000 (weight average, as determined by gel permeation chromatography); and the 210° F kinematic viscosity is between about 300 and 600 centistokes.

The liquid polyesters of the present invention may be used to advantage as plasticizers for a wide variety of vinyl resins including PVC homopolymers and PVC copolymers, wherein one or more other ethylenically unsaturated comonomers is copolymerized with vinyl chloride. Such comonomers may include, by way of example: vinyl bromide; vinyl acetate; vinylidene chloride; lower allyl esters; vinyl alkyl ethers; acrylonitrile and methacrylonitrile; acrylic acid and methacrylic acid; acrylic and methacrylic esters such as methyl acrylate, ethyl acrylate and methyl methacrylate; styrene; and the like. The liquid polyesters of the invention are particularly useful for the plasticization of PVC homopolymers and copolymers of vinyl chloride with vinyl acetate, vinyl chloride with vinyl butyrate, vinyl chloride with vinyl propionate, vinyl chloride with methyl methacrylate, vinyl chloride with vinylidene chloride and vinyl chloride with two or more comonomers, such as mixtures of vinylidene chloride and 2-ethylhexylacrylate, particularly when the copolymers contain 75 percent by weight or more bound vinyl chloride.

The amount of polyester used can be widely varied and will normally range from about 75 up to about 110 parts by weight per 100 parts by weight of the vinyl chloride homopolymer or copolymer. The polyesters are particularly useful for the plasticization of PVC resin, which is formed into gaskets for appliances made of textured metal, especially refrigerator and freezer door gaskets. The polyesters of the invention may be utilized in combination with other plasticizers. When combined with other plasticizers, the total amount of plasticizer will generally fall within the above-prescribed range.

The polyesters of this invention are also compatible with other known compounding ingredients commonly employed in the formulation of PVC. Such ingredients include stabilizers to protect the resin from the deleterious effects of oxidative, thermal and photo-chemical degradation, fillers, pigments, dyes, lubricants and other processing aids. As is evident to those skilled in the art of compounding and formulating PVC, the type and amount of compounding ingredients used will be determined by the physical properties desired.

The vinyl resin is preferably plasticized by hot compounding, in which the plasticizer and resin powder, together with the stabilizers, fillers or other compounding ingredients, as desired, are mixed and fluxed on a two-roll mill at about 300°–350° F., or in a Banbury mixer (Farrel Corp.) or similar intensive mixer or mill. The exact temperature employed will depend on the plasticizer and resin selected. The plasticized resin is transferred to an extruder which forms the resin into a rubber-like strip material suitable for use as a gasket for a refrigerator or freezer door as shown in the figure. The ratio of plasticizer to resin in the composition is satisfactory if the final gasket material produces a hardness test result on a Shore durometer of 55±5.

The following examples illustrate the invention more fully. They are not, however, intended as a limitation on the scope thereof. In the examples, all percentages are on a weight basis unless otherwise indicated.

EXAMPLE I

A polyester plasticizer of the invention was prepared from the following reactants:

| Reactant | Percent** |
| --- | --- |
| Methyl Esters of Mixed Dicarboxylic Acids* | 53.5 |
| Dimethyl terephthalate | 7.0 |
| Neopentyl glycol | 18.8 |
| Propylene glycol | 20.7 |

*The dicarboxylic acid ester mixture has the following composition (approximate): dimethyl succinate (1%), dimethyl glutarate (75%) and dimethyl adipate (24%). A mixture of this approximate composition is commercially available as DBE-2, a product of E.I. dupont de Nemours & Co.
**Based on the total weight of reactants charged to reaction flask.

The above reactants were charged to a two liter flask equipped with a suitable agitator, a thermometer, and a distillation column and condenser. The condenser was arranged so that material could be distilled from the reaction at either atmospheric or reduced temperature. Also added to the reaction vessel were 0.01% of hypophosphorous acid ($H_3PO_2$) (50% solution) and 0.03% dibutyltindiacetate (DBTDA) (a product of M & T Chemicals), based on the total weight of the initially added charge. The DBTDA acts as a catalyst for ester interchange.

The mixture was then slowly heated to about 225° C. so that controlled distillation was achieved at atmospheric pressure. The distillation resulted in the removal of methanol and assisted in driving the esterification reaction. Distillation of methanol began when the mixture reached a temperature of about 60°–65° C. After this distillation, the heating was interrupted overnight and the temperature of the mixture fell to 25° C.

The mixture was subsequently reheated to 225° C. The pressure was then gradually reduced to about 5 Torr and the temperature maintained at 225° C. A sample was taken of the reaction product, the viscosity of which at 210° F. was found to be 252 centistokes. The reaction was allowed to continue for another forty-five minutes under vacuum to reduce the pressure to about 1 Torr, and a second sample was taken. The viscosity at 210° F. of the second sample was determined to be 455 centistokes. The reaction mixture was finally cooled and emptied into two one-pint jars.

The final product was tested and found to have an acid value (AV) of 0.4, a hydroxyl value (OHV) of 33.5, a viscosity at 210° F. of 466 centistokes and a color value of 2+G according to the Gardner 1963 Color Scale. The product yield was 68.8%, determined on the basis of the weight of reaction product as a percentage of the weight of the initially added charge. The product was a crystal clear liquid that was useful as a plasticizer without further modification or processing. It was readily incorporated into vinyl resins using the conventional processing method and equipment described above.

EXAMPLE II

An acetylated derivative of the polyester plasticizer of Example I was made using the same weight percentages of the reactants and following the same general procedure described in Example I up to the point at which the second sample was taken and evaluated.

After the second sample was taken, the reaction vessel was restored to atmospheric pressure and 142 g. of acetic anhydride (50% solution) was added to the vessel maintained at a temperature of 222° C. Two hours after addition of the acetic anhydride, heating was discontinued overnight.

The reaction mixture was subsequently reheated to 155° C., the pressure in the vessel was reduced to 1 Torr and steam stripping of excess propylene glycol began. After approximately 3 hours,. the reaction mixture was dried and emptied into a one gallon jar.

The final product was tested and found to have an AV of 2.4, an OHV of 9.2, a viscosity at 210° F. of 363 centistokes, and a color value of 3G according to the Gardner 1963 Color Scale. The product yield was 70.5% determined on the basis of the weight of reaction product as a percentage of the weight of the initially added charge. The product was a clear liquid which was useful as a plasticizer without further modification or processing. It was readily incorporated into vinyl resins using the conventional processing method and equipment described above.

EXAMPLE III

Plasticizers were made according to Examples I and II (Plasticizers I and II) and compared with three prior art plasticizers (Plasticizers A–C) for their marring effect on textured metal coatings.

Plasticizer A was prepared by charging the following reactants to a vessel under conditions of heat and pressure similar to those described in Example I, above.

| Reactant | Percentage* |
| --- | --- |
| Ethylene Glycol | 10.83 |
| Neopentyl Glycol | 10.62 |
| Adipic Acid | 21.88 |
| Azelaic Acid | 3.23 |
| Phthalic Anhydride | 23.96 |
| 2-Ethylhexanol | 29.48 |
| | 100.00 |

*Based on the total weight of reactants charged to the reaction flask.

Also added to the reaction vessel were 0.01 wt. % of hypophosphorus Acid ($H_3PO_2$) (50% solution) and 0.03 wt. % of E9819U clay catalyst (a product of the Emery Group of Henkel Corporation). The catalyst is prepared in accordance with the teachings of U.S. Pat. No. 4,043,941.

Plasticizer B was prepared under conditions similar to those used in preparing Plasticizer A, but with the following reactants.

| Reactant | Percentage |
| --- | --- |
| Propylene Glycol | 8.3 |
| Neopentyl Glycol | 27.7 |
| Adipic Acid | 49.2 |
| Isodecyl Alcohol | 14.8 |
| | 100.0 |

$H_3PO_2$ and clay catalyst were added in the same weight percentages as noted above in the preparation of Plasticizer A.

Plasticizer C is Nuodex 910, a product of the Nuodex Corporation. It is believed to be the product of the reaction of propylene glycol (6–9%), neopentyl glycol (25–30%), adipic acid (41–51%) and isodecyl alcohol (12–18%). Plasticizers B and C are believed to be of similar composition. These plasticizers were each mixed with a PVC resin according to the following formulation, and formed into gasket-like strip materials using the mixing and extrusion procedures described above.

| | |
| --- | --- |
| PVC resin (GEON 102 EPFS) | 100 |
| Atomite (filler) | 40 |
| Barium—Cadmium Stabilizer (FERRO 1820) | 2 |
| Phosphite Stabilizer (FERRO 904) | 1 |
| Epoxidized Soybean Oil | 5 |
| Plasticizer | 90 |

The barium cadmium stabilizer terminates potential chain reaction initiated by the loss of hydrogen chloride from the resin. The phosphite stabilizer prevents oxidation of the resin. The epoxidized soybean oil absorbs hydrogen chloride generated during a thermal reaction occurring during processing of the resin.

The resulting gasket-like strip materials were tested for enamel mar resistance on cold rolled steel test panels each measuring approximately 4"×12". The test panels had been coated with 0.2 mil of a polyurethane primer and with 0.8 mil of a top coat, which was either a control coating or one of the four different coatings indicated below (AD 330-97, -98, -99, and -100).

The control coating was a standard porcelin-type, non-embossed coating having a harder finish than the other test coatings, its glass transition temperature (Tg) being in the range of 140°–150° F. Because of its harder finish, the control is more resistant to mar than the other four coatings tested and provides a suitable standard for comparison.

Coatings AD 330-97, -98, -99, and -100 are proprietary pre-coat enamel formulations of PPG Industries designed to permit embossing or texturing of fully finished cold rolled steel.

Each precoated test panel was wiped clean with a towelet soaked in isopropyl alcohol. Each test strip was then placed on the test panel against the enameled side, four strips to a panel. An analox roller was used to roll the test strip onto the enamel to insure good contact therebetween. Weight was added to each test strip to equal 2 psi per sample. The test assembly was then aged in an oven at 150° F. ± 2° F. for a period of 7 days. At the end of that time, the test assembly was dismantled, and visually inspected for evidence of mar on the enamel surfaces that were in contact with the test samples. "Trace" mar indicates that the test sample caused only a slight change in the pattern of light reflected from the enamel surface. "Slight" mar indicates that the presence of the test sample on the enamel surface can be detected by touch or by a visible distortion of the profile of the coating after the sample is removed. "Moderate" mar indicates a slight raising of the enamel surface when the vinyl sample is removed. Mar resistance evaluated as slightly better than the norm is denoted by a minus sign (−); mar resistance slightly worse than the norm is denoted by a plus sign (+). On a comparative basis trace mar is more desirable than slight mar, which is more desirable than moderate mar.

A gasket material producing no more than slight mar is considered commercially acceptable by gasket manufacturers.

| Plasticizer | Test Panel | Result |
| --- | --- | --- |
| A | Control | Trace Mar |
| B | " | Trace Mar |
| C | " | Trace Mar |
| I | " | Trace Mar |
| II | " | Trace Mar − |
| A | AD 330-97 | Moderate Mar |
| B | " | Slight Mar + |
| C | " | Slight Mar + |
| I | " | Slight Mar |
| II | " | Slight Mar |
| A | AD 330-98 | Moderate Mar |
| B | " | Slight Mar + |
| C | " | Slight Mar + |
| I | " | Slight Mar |
| II | " | Slight Mar − |
| A | AD 330-99 | Slight Mar |
| B | " | Slight Mar − |
| C | " | Slight Mar |
| I | " | Slight Mar − |
| II | " | Slight Mar − |
| A | AD 330-100 | Slight Mar |
| B | " | Slight Mar |
| C | " | Slight Mar − |
| I | " | Slight Mar |
| II | " | Slight Mar − |

The gasket made with plasticizer of Examples I and II generally produced excellent mar resistance results. It was observed during these tests that the test strip including Plasticizer II (which generally produced the best mar resistance results) had a somewhat disagreeable odor, which may make it undesirable for incorporation in a gasket provided on home appliances. Overall, Plasticizer I was determined to be best suited for use as a commerical plasticizer.

EXAMPLE IV

Gasket-like strip materials containing three different plasticizers, Plasticizer I (Example I), Plasticizer A (Example III), and Plasticizer D (described below), were tested to evaluate their effect on the hardness of an organic coating over time.

Plasticizer D is a non-terminated linear aliphatic polyester consisting essentially of polypropylene azelate and having extremely high viscosity (i.e., about 16,000 centistokes at 100° F.) and hydroxyl value of less than 25. It is a prior art product which is known to be compatible with internally plasticized alkyd coatings, but its high viscosity and relatively high cost make it commercially unattractive.

The three plasticizers were each separately mixed with a PVC resin according to the formulation set forth in Example III and formed into gasket-like strip materials using the mixing and extrusion procedures described above.

Panels made of the type of coil stock steel used for appliances and measuring 4"by 6"were supplied by Hanna Chemical Corporation. The panels had been coated with either a soft coating (Tg=115° C.;) or a hard coating (Tg=130° C). The soft and hard coatings each comprised a polyurethane primer and a top coat of oil free polyesters; the difference in the two coatings being the degree of cross-linking of the polyester top coat, the hard coating having the greater cross-linking.

Test strips measuring 2"×4"×75 mm. were prepared from the aforementioned gasket materials including the three plasticizers. The strips were placed on top of the coated panels, one to a panel. A glass plate was placed over the coated panel and gasket material. A two pound weight was placed on top of the glass plate. The entire test assembly was heated in an oven at 50° C. to simulate aging of the coating. At intervals of 20, 40, 60 and 130 hours after commencement of the heating, the coatings were tested for hardness.

The hardness testing was carried out on a Sward Hardness Rocker Model C, available from Pacific Scientific Company in Bethesda, Md.

The Hardness Rocker consisted of two flat, chromium-plated bronze rings fixed together by a rack which supports two bubble tube-type levels and equipped with a vertical screw mounted from the top of the rings. The levels are used to measure the amplitude of the oscillations of the Hardness Rocker. The rate of change in amplitude is used as a measure of the softness of the test surface. The Hardness Rocker has the following characteristics:
Weight 100±10 g
Diameter 10 cm (4 in.)
Width between rings 2.5 cm (1 lb.)
Period 50 swings on glass plate in 60.0±0.5 sec.
Calibration Decrease in amplitude of 6 deg. taken between approximately 22 and 6 degrees from the vertical, after 50 swings on glass The Hardness Rocker was placed level on the plate glass and calibrated by carrying out 50 complete oscillations in 60±0.5 seconds.

After the coated panels were removed from the oven, the coating test samples were cooled for 5 minutes at ambient temperature (i.e. 25° C.) before testing with the Hardness Rocker. The hardness of the panel was measured and compared with the hardness of two control panels that were not exposed to the gasket material. One of the two control panels had been kept at ambient temperature and the second control panel had been heated at 50° C. like the test panels. The hardness results obtained for each time period (i.e. 20, 40, 60 and 130 hours) and a softening percentage are given in Table I below. The softening percentage is calculated as follows:
Softening % =[($H_o$–H)/$H_o$]×100.
$H_o$=hardness of unexposed heated panel and
H=hardness of exposed panel.

The softening percentage indicates the percentage loss of coating hardness, with 100% representing a complete loss and 0% representing no loss.

As indicated in Table I, the coatings of the test panels exposed to the gasket material plasticized with Plasticizer A declined in hardness over the entire test period. After 130 hours, the hard and soft coatings of the test panel had lost 33.3% and 55% of their hardness, respectively. The softening percentage for the soft coating was approximately equivalent to the minimum level of hardness that can be detected by the Sward Hardness Rocker.

The soft coating exposed to the gasket material plasticized with Plasticizer D showed detectable loss of hardness after 20, 40 and 130 hours.

The test panel exposed to the gasket material plasticized with Plasticizer I exhibited 0% softening after 60 hours, and only 2.6% softening after 130 hours for the hard finish and 4.9% softening for the soft finish.

After a 130 hour test interval, the hardness results for the hard and soft coated test panels exposed to the gasket material plasticized with Plasticizer I were virtually identical to the % softening of the hard and soft coatings resulting from exposure of the gasket material to the high-viscosity, high-cost Plasticizer D.

EXAMPLE V

The gasket materials plasticized with Plasticizers I and D, prepared as described in Example IV were also tested for extractability by soapy water over time. Test results are expressed in terms of the percentage of the material extracted. Extraction of less than 5% of the plasticizer in this test is considered commercially acceptable by gasket manufacturers.

In carrying out this soapy water extraction test procedure, two 2-½" diameter samples are die cut from a 20 mil pressed sheet of gasket material. The initial weight ($W_1$) of the material is determined (in grams, to 3 decimal places). Each sample was then immersed on special racks in 1% Ivory Soap solutions at 90° C. for 1, 3 and 7 days. After drying at 50° C. for 3 hours in an air circulating oven, samples were conditioned at 22° C. for 0.5 hr., then backweighed ($W_2$), and the weight loss calculated as follows:

Percent weight loss=($W_1$–$W_2$×100)/$W_1$ where:
$W_1$=initial weight
$W_2$=weight after extraction.
The results of this test are given in Table II below.

The lower extraction percentages over time are due to adsorption of water by the filler in the gasket material. The results obtained with the gasket material plasticized with Plasticizer I are within commercially acceptable limits.

While certain preferred embodiments of the present invention have been described and exemplified herein, it is not intended to limit the invention to such embodiments, but variations and modifications may be made therein and thereto without departing from the scope and spirit of the invention, as set forth in the following claims.

TABLE I

Hardness of Coatings and Softening % Data Time in Oven at 50° C.

| Panel # | Control/ Gasket Plasticizer | 0 hours Hardness | 20 hours Hardness | 20 hours Softening % | 40 hours Hardness | 40 hours Softening | 60 hours Hardness | 60 hours Softening 4 | 130 hours Hardness | 130 hours Softening |
|---|---|---|---|---|---|---|---|---|---|---|
| Hard | Control (No Heat) | 44.8 | 44.8 | — | 44.8 | — | 44.8 | — | 44.8 | — |
| " | Control (Heated) | 36 | 36 | — | 38 | — | 38 | — | 39 | — |
| " | Plasticizer D | 36 | 36 | 0 | 36 | 0 | 38 | 0 | 38 | 0 |
| " | Plasticizer A | 36 | 36 | 0 | 34 | 5.6 | 28 | 22.2 | 24 | 33.3 |
| " | Plasticizer I | 36 | 36 | 0 | 39 | 0 | 39 | 0 | 38 | 0 |
| Soft | Control (No Heat) | 43.2 | 43.2 | — | 43.2 | — | 43.2 | — | 43.2 | — |
| " | Control (Heated) | 40 | 40 | — | 40 | — | 40 | — | 41 | — |
| " | Plasticizer D | 40 | 38 | 5 | 39 | 2.5 | 40 | 0 | 39 | 2.5 |
| " | Plasticizer A | 40 | 28 | 30 | 24 | 37.5 | 20 | 50 | 18 | 55 |
| " | Plasticizer I | 40 | 40 | 0 | 40 | 0 | 40 | 0 | 39 | 2.5 |

TABLE II

Extraction Data

Initial Weight/Weight Loss/Percentage Loss

| Gasket Plasticizer | First Day | Third Day | Seventh Day |
|---|---|---|---|
| Plasticizer D | | | |
| Test Sample #1 | 2.0806 0.0230/ 1.1% | 2.0806 0.0189/ 1.0% | 2.0806 0.0098/ 0.5% |
| Test Sample #2 | 2.2268 0.0251/ 1.1% | 2.2268 0.0219/ 1.0% | 2.2268 0.0150/ 0.7% |
| Plasticizer I | | | |
| Test Sample #1 | 2.0705 0.0848/ 4.1% | 2.0705 0.0842/ 4.1% | 2.0705 0.0415/ 2.0% |
| Test Sample #2 | 2.1762 0.0900/ 4.1% | 2.1762 0.0876/ 4.0% | 2.1762 0.0460/ 2.1% |

What is claimed is:

1. A composition comprising a thermoplastic polyvinyl chloride homopolymer or copolymer containing an amount of a liquid polyester effective to plasticize said homopolymer or copolymer; wherein said liquid polyester is unterminated and has the formula

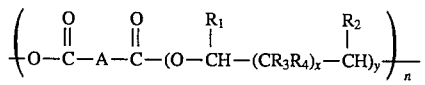

wherein in each subunit (n) of said polyester A is independently selected from the group consisting of straight or branched, saturated hydrocarbon chains, containing from 1 to 10 carbon atoms, or substituted or unsubstituted arylene moieties, and $R_1$, $R_2$, $R_3$, and $R_4$ are each independently selected from the group consisting of hydrogen or alkyl containing from 1 to 4 carbon atoms; n=4–20, x=0–4 and y=1–3, said polyester having a hydroxyl value of at least 25, a weight average molecular weight of from about 3,000 to about 10,000, and wherein at least two subunits contain different

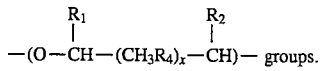

groups.

2. A composition in accordance with claim 1 wherein the amount of polyester is between about 75 parts and about 110 parts per 100 parts of homopolymer or copolymer.

3. A composition in accordance with claim 1 wherein said homopolymer or copolymer is PVC.

4. A composition comprising a polyvinyl chloride resin and an unterminated liquid polyester comprising subunits of the formula III–IV

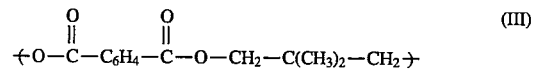

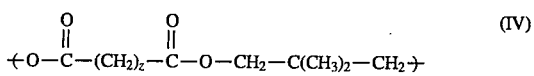

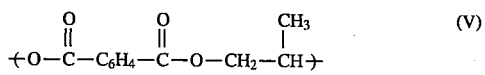

and

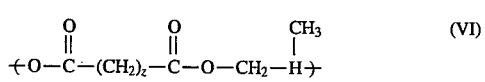

wherein z =2–4, subunit III comprising from about 2.5 to about 15 percent of the total subunits of said polyester, subunit IV comprising from about 15 to about 50 percent of the total subunits of said polyester, subunit V comprising from about 2.5 to about 24 percent of the total subunits of said polyester, and subunit VI comprising from about 35 to about 80 percent of the total subunits of said polyester; z=2 in about 0.2 to about 2 percent of said subunits IV and VI; z=3 in about 60 to about 85 percent of said subunits IV and VI; and z=4 in about 15 to about 40 percent of said subunits IV and VI, said polyester having a weight average molecular weight of from about 3,000 to about 10,000, and being present in an amount effective to plasticize said resin.

5. A composition comprising a thermoplastic polyvinyl chloride homopolymer or copolymer containing an amount of a liquid polyester effective to plasticize said homopolymer or copolymer; wherein said liquid polyester has the formula

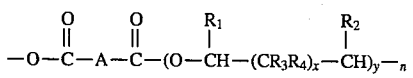

wherein in each subunit (n) of said polyester A is independently selected from the group consisting of straight or branched, saturated hydrocarbon chains, containing from 1 to 10 carbon atoms or substituted or unsubstituted arylene moieties, and $R_1$, $R_2$, $R_3$, and $R_4$ are each independently selected from the group consisting of hydrogen or alkyl containing from 1 to 4 carbon atoms; n=4–20, x=0–4 and y=1–3, said polyester being acylated and having an hydroxyl value from about 5 to about 15 and wherein the nonacylated polyester has a weight average molecular weight of from about 3,000 to about 10,000.

6. The composition of claim 1 wherein the liquid polyester has a hydroxyl value of between 25 and 45.

7. The composition of claim 1 wherein the liquid polyester has a 210° F kinematic viscosity of about 300 to about 600 centistokes and an acid value of less than 3.

8. The composition of claim 1 wherein the liquid polyester comprises the following subunits

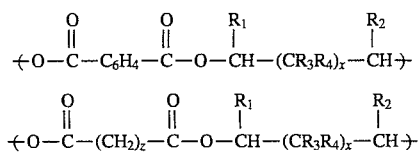

wherein in each said subunit of said polyester $R_1$, $R_2$, $R_3$ and $R_4$ are each independently selected from the group consisting of hydrogen or alkyl containing from 1 to 4 carbon atoms, x=0–4 and z=2–4, subunit I comprising from about 5 to about 40 percent of the total subunits of said polyester and subunit II comprising from about 55 to about 95 percent of total subunits of said polyester.

9. The composition of claim 8 wherein in the polyester z=2 in about 0.2 to about 2.0 percent of said subunit II, z=3 in about 60 to about 85 percent of said subunit II, and z=4 in about 15 to about 40 percent of subunit II.

10. The composition of claim 5 wherein the acylated polyester has a hydroxyl value of from about 8 to about 12.

11. The composition of claim 5 wherein the acyl group is acetyl.

* * * * *